(12) United States Patent
Malsam et al.

(10) Patent No.: US 9,101,097 B2
(45) Date of Patent: Aug. 11, 2015

(54) HARVESTING MACHINE

(75) Inventors: Craig S. Malsam, Omaha, NE (US);
Dennis R. Theilen, Omaha, NE (US)

(73) Assignee: Valmont Industries, Inc., Omaha, NE (US)

( * ) Notice: Subject to any disclaimer, the term of this patent is extended or adjusted under 35 U.S.C. 154(b) by 312 days.

(21) Appl. No.: 13/570,574

(22) Filed: Aug. 9, 2012

(65) Prior Publication Data

US 2013/0041537 A1    Feb. 14, 2013

Related U.S. Application Data

(60) Provisional application No. 61/521,479, filed on Aug. 9, 2011.

(51) Int. Cl.
| G06F 7/70 | (2006.01) |
| A01G 25/09 | (2006.01) |
| A01G 25/16 | (2006.01) |

(52) U.S. Cl.
CPC ............ *A01G 25/095* (2013.01); *A01G 25/162* (2013.01); *Y02T 10/7258* (2013.01)

(58) Field of Classification Search
CPC ............ G06F 7/70; G06F 19/00; G06G 7/00; G06G 7/76
USPC ............................................ 701/50, 412, 470
See application file for complete search history.

(56) References Cited

U.S. PATENT DOCUMENTS

| 4,059,911 A | 11/1977 | Bean |
| 4,209,068 A | 6/1980 | Corsentino |
| 5,685,497 A | 11/1997 | Cole |
| 6,039,273 A * | 3/2000 | Christensen .................. 239/729 |
| 6,755,362 B2 | 6/2004 | Krieger |
| 2012/0305682 A1* | 12/2012 | Korus .......................... 239/731 |

FOREIGN PATENT DOCUMENTS

EP    0040828    12/1981

* cited by examiner

*Primary Examiner* — Kim T Nguyen
(74) *Attorney, Agent, or Firm* — Milligan PC LLO; David H. Milligan

(57) ABSTRACT

An irrigation system is disclosed that includes a ground-based platform. In an implementation, an irrigation system includes a span of overhead irrigation equipment. The irrigation system also includes a ground-based platform for coupling with the span of overhead irrigation equipment. The ground-based platform includes a drive for moving the ground-based platform. The irrigation system also includes a linkage for coupling the span of overhead irrigation equipment with the ground-based platform. The linkage is communicatively coupled with the drive of the ground-based platform for communicating information regarding a change in at least one of a position, a direction, or a speed of the span of overhead irrigation equipment with respect to the ground-based platform. The drive of the ground-based platform is configured to use the information received from the linkage to coordinate movement of the ground-based platform with movement of the span of overhead irrigation equipment.

20 Claims, 4 Drawing Sheets

HARVESTING MACHINE

CROSS-REFERENCE TO RELATED APPLICATIONS

The present application claims the benefit under 35 U.S.C. §119(e) of U.S. Provisional Application Ser. No. 61/521,479, entitled HARVESTING MACHINE, filed on Aug. 9, 2011. U.S. Provisional Application Ser. No. 61/521,479 is herein incorporated by reference in its entirety.

BACKGROUND

Modern day agriculture has become increasingly efficient in the past century and this trend must continue in order to produce a sufficient food supply for the increasing world population. A notable advancement in agricultural production was the introduction of mechanized irrigation systems, such as the center pivot and the linear move irrigation systems. These irrigation systems make it possible to irrigate entire fields, and reduce a crop yield's vulnerability to extreme weather conditions. The ability to monitor and to control the amount of water and/or nutrients (applicants) applied to an agricultural field has increased the amount of farmable acres in the world and increases the likelihood of a profitable crop yield. These irrigation systems typically include a control device configured to furnish a user interface allowing the operator to monitor and control one or more functions or operations of the irrigation system.

SUMMARY

An irrigation system is disclosed that includes a ground-based platform. In an implementation, an irrigation system includes a span of overhead irrigation equipment. The irrigation system also includes a ground-based platform for coupling with the span of overhead irrigation equipment. The ground-based platform includes a drive for moving the ground-based platform. The irrigation system also includes a linkage for coupling the span of overhead irrigation equipment with the ground-based platform. The linkage is communicatively coupled with the drive of the ground-based platform for communicating information regarding a change in at least one of a position, a direction, or a speed of the span of overhead irrigation equipment with respect to the ground-based platform. The drive of the ground-based platform is configured to use the information received from the linkage to coordinate movement of the ground-based platform with movement of the span of overhead irrigation equipment.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The Detailed Description is described with reference to the accompanying figures. The use of the same reference numbers in different instances in the description and the figures may indicate similar or identical items.

DETAILED DESCRIPTION

Overview

Figure 1A:
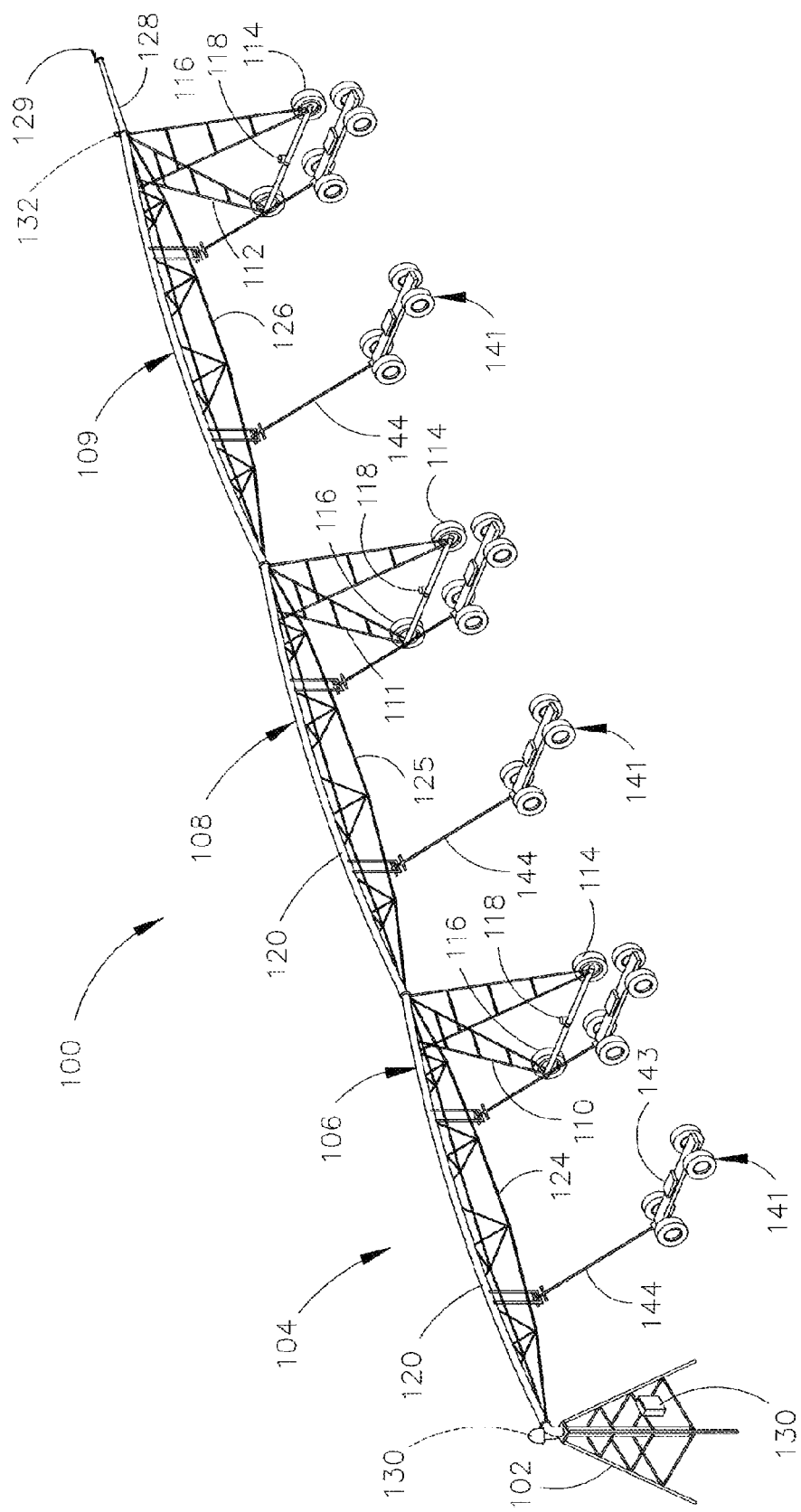
FIG. 1A is a partial perspective view illustrating a system providing central pivot overhead irrigation equipment with a moveable ground-based platform for aiding with harvesting and pruning operations in accordance with an example implementation of the present disclosure.

Overhead irrigation equipment can be used to provide a moveable overhead sprinkler platform for supplying water and chemicals to assist with growing agricultural crops. One type of overhead sprinkler irrigation is center pivot irrigation, where segments of pipe are joined together and supported by trusses, mounted on wheeled towers with sprinklers positioned along the pipe segments. This type of configuration provides movement in a circular pattern and is supplied with water from a pivot point at the center of the circle. Center pivot irrigation systems may be powered using water, hydraulics, and/or electric motors. Another type of sprinkler irrigation is linear/lateral move irrigation, where similar equipment is configured to move in a straight line.

It may be desirable to add moveable platforms at various positions along a span of overhead irrigation equipment. Such platforms may be used for transporting workers and/or equipment for harvesting and/or pruning operations. For example, workers may be transported along with containers for manually harvesting and pruning grapes. In some instances, each platform may need to support the weight of three adults and three containers, where each container can weigh up to one thousand pounds (1,000 lbs). In a configuration requiring thirty (30) platforms in a one hundred eighty foot (180 ft) span of irrigation equipment, this may be as much as one hundred thousand pounds (100,000 lbs) of people and produce per span.

One technique for supporting such platforms can include hanging the platforms from overhead irrigation equipment. However, this technique may require a reinforced span structure with multiple drive towers, and potentially different motors and/or gearboxes. This type of configuration may also make it difficult to uniformly apply water and chemicals around the obstacles created by suspending the platforms from the irrigation equipment.

Accordingly, an irrigation system including moveable ground-based platforms for transporting workers, equipment, and/or crops is provided. The irrigation system provides moveable platforms for connecting to overhead irrigation equipment for harvesting and/or pruning operations that does not necessarily require modification of existing irrigation equipment. A non-rigid linkage may be used to couple the ground-based platform to the irrigation equipment. The ground-based platform includes a drive for moving the platform, where the drive is connected to the linkage and receives positional, directional, and/or speed information regarding the irrigation system. The ground-based platform may be connected to a span of central pivot irrigation equipment or linear irrigation equipment. The ground-based platform may include a sensor for sensing mechanical forces exerted on the non-rigid linkage by the irrigation equipment to determine changes in position, direction, and/or speed of the irrigation equipment with respect to the ground-based platform. The irrigation system may include a power connection for powering the ground-based platform from the irrigation equipment. The ground-based platform may include a cooling system for cooling harvested crops, such as produce and so forth.

Figure 1B:
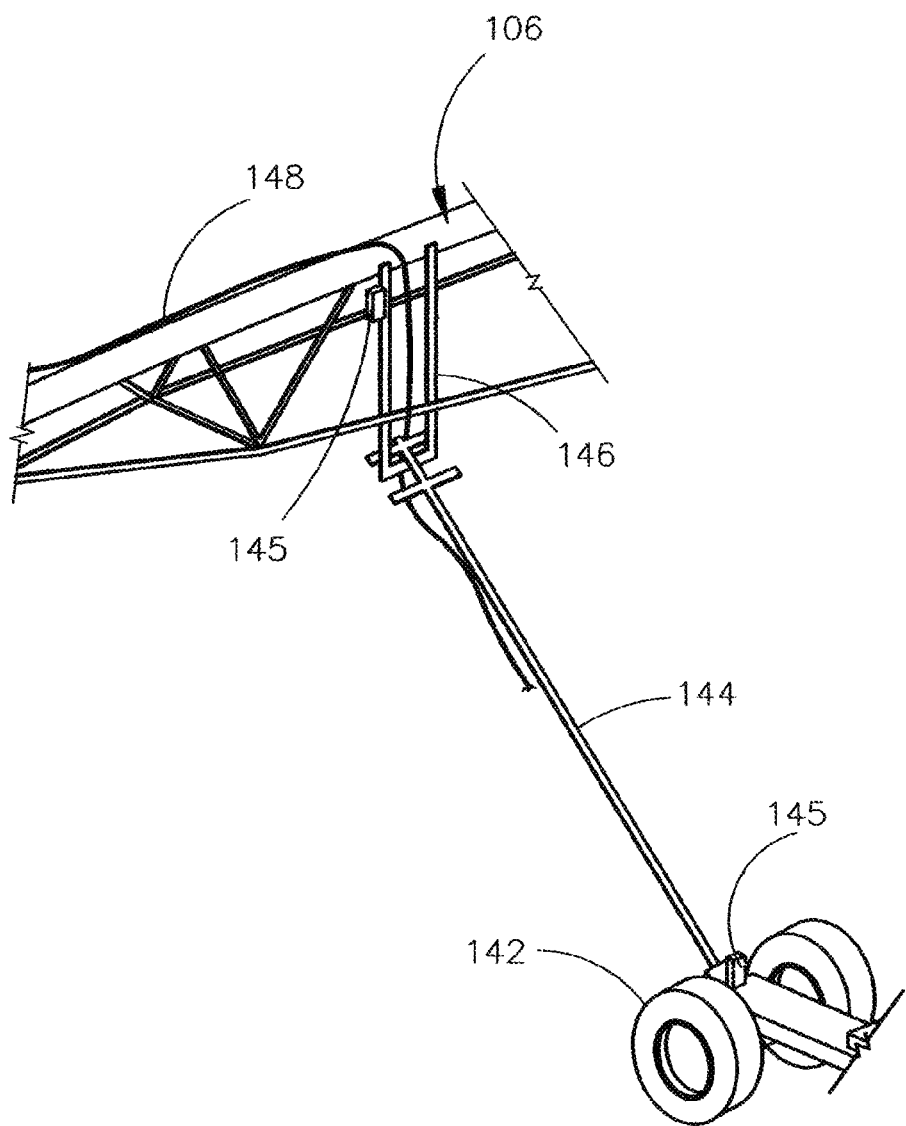
FIG. 1B is a partial perspective view of a non-rigid linkage and a power connection extending from the central pivot overhead irrigation equipment illustrated in FIG. 1A.
Figure 1C:
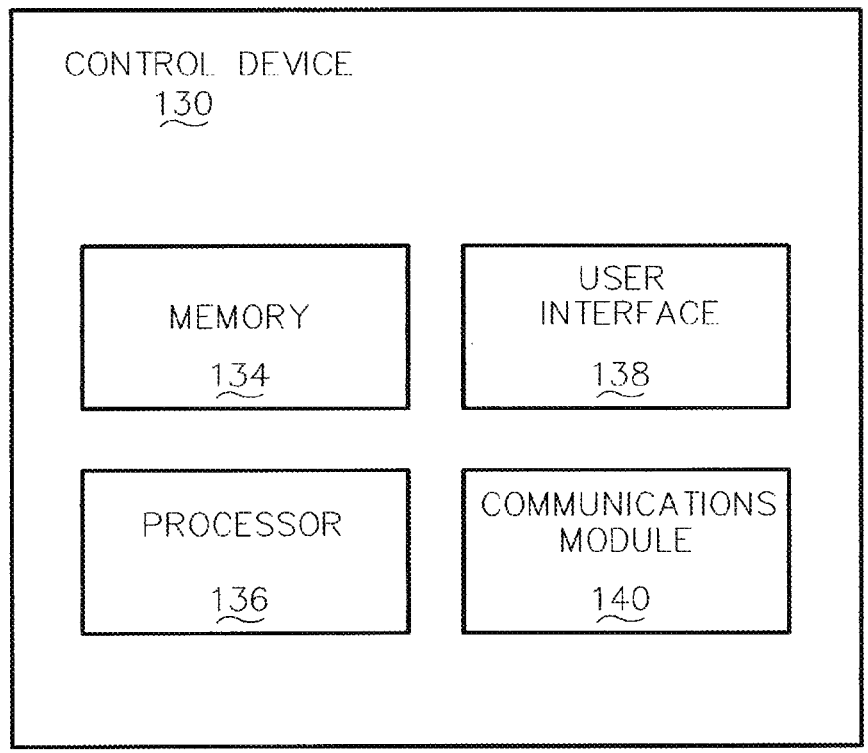
FIG. 1C is a block diagram illustrating a control device of the irrigation system shown in FIG. 1A in accordance with an example implementation of the present disclosure.
Figure 2:
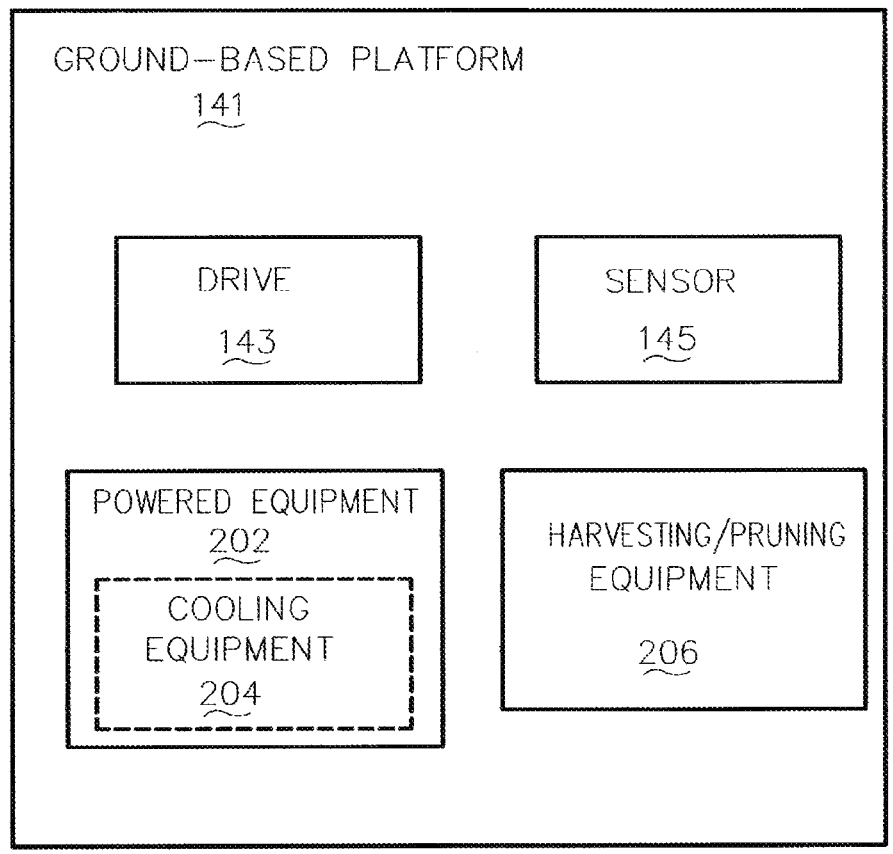
FIG. 2 is a block diagram illustrating an example implementation of the movable ground-based platform shown in FIG. 1A, wherein the ground-based platform includes a drive for moving the ground-based platform, a sensor for sensing mechanical forces exerted on the non-rigid linkage, powered equipment, and harvesting and/or pruning equipment for selectively removing portions of a plant.

Example Implementations:

FIGS. 1A through 2 generally illustrate irrigation systems in accordance with the present disclosure. As shown, a self-propelled irrigation system 100 includes a center pivot structure 102, a main section assembly 104 (irrigation section assembly) coupled (e.g., connected) to the center pivot structure 102. However, it is contemplated that the present disclosure may be implemented in other self-propelled irrigation systems (e.g., linear move irrigation systems). It is understood that these implementations are provided by way of example only and are not meant to be restrictive of the present disclosure. The center pivot structure 102 has access to a well, a water repository (e.g., water tank), or other fluid source, to furnish water to the irrigation system 100. For instance, the well may be located under the center pivot structure 102. In another instance, the well may be in close proximity to the cultivation area (e.g., field). The fluid source may be coupled to a repository or other source of agricultural products to inject fertilizers, pesticides, and/or other chemicals into the fluids to create an applicant for application during irrigation. Thus, the applicant may be water, fertilizer, herbicide, pesticide, combinations thereof, or the like. The irrigation system 100 may be coupled to a fluid displacement device (e.g., a pump assembly) configured to furnish applicant throughout the irrigation system 100. For example, the fluid displacement device may assist in displacing fluid from the fluid source (e.g., well, water repository, etc.) to the conduit portions of the irrigation system which are described herein. The center pivot structure 102 can be fixed or can be towable such that an operator can move the irrigation system 100 from one field to another. In an implementation, the center pivot structure 102 may comprise a frame assembly (e.g., galvanized steel frame assembly, and so forth).

The main section assembly 104 includes a number of interconnected spans 106, 108, 109 (e.g., irrigation spans) supported by one or more tower structures 110, 111 (intermediate tower structures) and an end tower structure 112. The tower structures 110, 111, 112 may be any tower configuration known in the art to adequately support the conduits (e.g., water pipe sections) described herein. It is understood that the section assembly 104 may include any number of spans and tower structures.

The tower structures 110, 111, and the end tower structure 112 each include wheels 114, 116, to assist in traversing the irrigation system 100 (e.g., allowing the main section assembly 104 to pivot) about a cultivation area (e.g., field). In an implementation, the wheels 114, 116 may be driven by a suitable variable-drive unit 118 (e.g., a drive motor), or the like, to assist in traversing the system 100 about the specified area. For example, each tower structure 110 may include a drive unit 118 to propel the respective tower structure 110, 111, 112 (and the irrigation system 100) through the cultivation area.

As shown in FIG. 1A, each span 106, 108, 109 includes conduits 120, 121, 122 (e.g., pipes) that are configured to carry (e.g., transport, provide, and so forth) liquid (e.g., applicant) along the length of the system 100 to one or more applicant dispersal assemblies that are configured to irrigate the cultivation area. Thus, each span 106, 108, 109 comprises a span of overhead irrigation equipment. Each conduit 120, 121, 122 may be coupled to one another to allow fluid communication between each conduit. In an implementation, the conduits 120, 121, 122 may be supported by truss-type framework structures 124, 125, 126. Thus, the main fluid displacement device may be configured to displace applicant through the conduits 120, 121, 122. As shown in FIG. 1A, the irrigation system 100 also includes a cantilevered boom structure 128 that extends outwardly from the end tower structure 112. In one or more implementations, the cantilevered boom 128 includes an end gun 129 (e.g., end gun 129 is mounted to the cantilevered boom 128). The end gun 129 may be a suitable pressure sprayer configured to be activated at the corners of a field, or other designated areas, to increase the amount of land that can be irrigated.

As shown in FIGS. 1A and 1C, the irrigation system 100 includes a control device 130 (e.g., control panel) that is in electronic communication with one or more components of the system 100. For example, the control device 130 may be in electronic communication with one or more tower boxes mounted at one or more tower structures 110, 111, 112, and a position sensor 132 utilized to determine an approximate position of the irrigation system (e.g., determining the approximate position of the end tower structure 112 within the cultivation area with respect to the center pivot structure 102). In an implementation, the position sensor 132 may be a GPS sensor (e.g., GPS receiver), or the like, mounted to the end tower structure 112 configured to transmit signals representing the position of the end tower structure to the control device 130. As described herein, the control device 130 is configured to determine the radial position of the main section assembly 104 with respect to the center pivot structure 102. In another implementation, the position sensor 132 may be an angle sensor 133 configured to facilitate determination of the rotational position of the main section assembly 104. The angle sensor 133 may be mounted to the center pivot structure 102 to assist in determining the rotational position of the main section assembly 104.

In an implementation, the control device 130 is mounted to the central pivot structure 102, a control cart, or a tower structure 110, 111, 112. The control device 130 is generally located on the structural element of the irrigation system 100 where the applicant/water is introduced into the irrigation system; however, other configurations known in the art are within the scope of the present disclosure.

The control device 130 is configured to monitor operating conditions and configured to control various functions of the irrigation system 100. In certain implementations, the control device 130 actively monitors the irrigation system's 100 function and performance including, but not limited to: a position of one or more conduit sections 120, 121, 122 or tower structures 110, 111, 112 (e.g., the position of the main section assembly 104), whether the irrigation system 100 is powered on or off, a voltage parameter associated with the irrigation system 100, a motor speed parameter associated with the irrigation system 100, an approximate ground speed parameter associated with the irrigation system 100, a direction parameter associated with the irrigation system 100, a diagnostic parameter associated with the irrigation system 100, whether the applicant is being supplied to the irrigation system 100 (e.g., whether the fluid displacement device is operational), whether the Stop in Slot (SIS) is powered on or off, an applicant pressure associated with the irrigation system 100, a time parameter, a date parameter, a field position parameter of the irrigation system components, end-gun status, and whether the programs (e.g., software programs, etc.) are running properly. The control device 130 also controls the irrigation system's 100 functions and settings including, but not limited to: start and stop, selectively powering the main fluid displacement device, an applicant application depth parameter, the direction of travel associated with the irrigation system 100, selectively powering the SIS, automatically reversing or stopping the irrigation system 100, automatically restarting the irrigation system 100, providing an operator auxiliary control to the system 100, writing and editing irrigation programs (e.g., irrigation software programs), and controlling sector and sequential programs (e.g., software programs). In another implementation, the control device 130 may cause an alert to be issued to the operator if there are any errors in the operation of the irrigation system 100 or if any of the functions or conditions monitored by the control device 130 have been compromised (e.g., ceased operation or are outside an acceptable range).

The control device 130 may be housed in a weather-proof box and, as shown in FIG. 1C, includes at least a memory 134 to store one or more software programs (e.g., software modules), a processor 136 communicatively coupled to the memory 134, a user interface 138 (e.g., graphical user interface, etc.), and a communications module 140 (e.g., transmitter, receiver, transceiver, etc.). The memory 134 is an example of tangible computer-readable media that provides storage functionality to store various data associated with the operation of the control device 130, such as software programs/modules and code segments mentioned herein, or other data to instruct the processor 136 to perform the steps described herein.

As shown in FIGS. 1A and 1B, the irrigation system 100 further includes a ground-based platform 141 for coupling to the spans 106, 108, 109 of overhead irrigation equipment. Thus, the ground-based platform 141 can be connected to other types of moveable overhead irrigation equipment. In some cases, the spans 106, 108, 109 of overhead irrigation equipment may "lead" (travel in front of) a ground-based platform 141, while in other cases, the spans 106, 108, 109 of overhead irrigation equipment may "follow" (travel behind) a ground-based platform 141.

As shown in FIG. 2, the ground-based platform 141 includes a drive 143 for moving the ground-based platform 141. For example, the ground-based platform 141 may be implemented as a cart including one or more electric motors (e.g., drives 143) connected to a number of wheels 142 supporting the cart to move the ground-based platform 141 along over the ground. The irrigation system 100 includes a linkage, such as non-rigid linkage 144, for coupling a corresponding span (e.g., spans 106, 108, 109) of overhead irrigation equipment with the ground-based platform 141. The non-rigid linkage 144 is communicatively coupled with the drive of the ground-based platform 141 for communicating information regarding one or more of a change in position, a change in direction, and/or a change in speed of the corresponding span 106, 108, 109 of overhead irrigation equipment with respect to the ground-based platform 141. The drive 143 of the ground-based platform 141 is configured to use the information received from the non-rigid linkage 144 to coordinate movement of the ground-based platform 141 with movement of the span of overhead irrigation equipment. In one or more implementations, the non-rigid linkage 144 may comprise a simple steel beam coupled to the ground-based platform with a hinge-pin allowing the non-rigid linkage to move horizontally side to side at the base of the ground-based platform to actuate sensor 145. The non-rigid linkage may also be comprised of two separate steel beams, hinged along its length to allow the non-rigid linkage to fold back along itself when disconnected from the irrigation system 100 and not in use.

In implementations, the ground-based platform 141 includes a sensor 145 for coupling with the non-rigid linkage 144 for sensing mechanical forces exerted on the non-rigid linkage 144 by the corresponding span 106, 108, 109 of overhead irrigation equipment. The sensor 145 is configured determine changes in position, direction, and/or speed of the span of overhead irrigation equipment with respect to the ground-based platform 141, providing guidance and pace information to the cart. For example, the non-rigid linkage 144 can be connected to a connecting member of the span of overhead irrigation equipment, such as a hanger 146 suspended from the corresponding span 106, 108, 109 of overhead irrigation equipment. As the corresponding span 106, 108, 109 of overhead irrigation equipment moves (e.g., traverses) across the ground, the hanger 146 exerts forces such as pushing, pulling, and rotational/twisting forces on the non-rigid linkage 144, which are transmitted to the sensor 145 of the ground-based platform 141. The drive equipment (e.g., drive 143) of the ground-based platform 141 is configured to use the information from the sensor 145 to control movement (e.g., modify the speed) of the cart with respect to the corresponding span 106, 108, 109 of overhead irrigation equipment. As shown in FIG. 1B, the sensor 145 may mounted proximal (e.g., adjacent) to the hangar 146 or mounted on the ground-based platform 141 proximal (e.g., adjacent) to the linkage 144.

In some instances, push/pull forces exerted on the non-rigid linkage 144 by the corresponding span 106, 108, 109 of overhead irrigation equipment can be translated to on, off, forward, and reverse commands sent to one or more electric motors driving the ground-based platform 141. Further, forces can be translated to motor speed increase and decrease commands sent to one or more variable speed electric motors (e.g., 143) powering the ground-based platform 141. Additionally, rotational/twisting forces can be translated to skid steer instructions for steering by braking or engaging tracks or wheels (e.g., wheels 142) on one side of the ground-based platform 141. In implementations, one or more variable speed drive (VSD) motors can be used to smooth out operation of a cart, which may be more desirable to workers than a "stop-start" motor control configuration.

It should be noted that use of the hanger 146 suspended from a span 106, 108, 109 of overhead irrigation equipment can allow the linkage 144 to transmit pacing and guidance information to the ground-based platform 141 while exerting a minimal or at least substantially zero load on the span of overhead irrigation equipment. Further, connecting the linkage 144 to the hanger 146 may allow the ground-based platform 141 to be easily unhooked to accommodate furrows that do not require them during a rotation/pass of the corresponding span 106, 108, 109 of overhead irrigation equipment. Additionally, it should be noted that the ground-based platform 141 may be left in position allowing the corresponding span 106, 108, 109 of overhead irrigation equipment to pass over when the ground-based platform 141 is not in use.

In implementations, each ground-based platform 141 may be unique based upon a particular crop or type of crop being harvested. For example, each cart may be configured (e.g., sized and shaped) to accommodate a certain number or workers, equipment, storage containers, and so forth. Further, a ground-based platform 141 may include powered equipment 202, such as cooling equipment 204 for cooling crops as they are harvested. In some implementations, cart platforms may provide electrical compressor cooling or water cooling for crops. However, it should be noted that other powered equipment 202 may be provided with a ground-based platform 141 as well, including other types of cooling and storage equipment.

In some instances, the irrigation system 100 may include electrical power distribution equipment (e.g., equipment configured to furnish suitable electrical power for powering the ground-based platform) for delivering power to the ground-based platform 141. For example, the non-rigid linkage 144 coupling the span of overhead irrigation equipment with the ground-based platform 141 may comprise a power connection 148 for furnishing power to the ground-based platform 141 from the corresponding span 106, 108, 109 of overhead irrigation equipment. In this manner, each cart (e.g., ground-based platform 141) may receive electrical power from the "leading" or "following" span 106, 108, 109. In implementations, electrical power from the power connection 148 may be used to power one or more motors driving the ground-based platform 141. Further, electrical power from the power connection 148 can be used to power cooling equipment included with a ground-based platform 141. Electrical power from the power connection 148 can also be used to supply power to harvesting and/or pruning equipment 206, such as sheers and trimmers included with or used in conjunction with a ground-based platform 141. The harvesting and/or pruning equipment 206 is configured to selectively remove portions of a plant that are in contact with the equipment 206.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An irrigation system comprising:
a plurality of interconnecting spans of overhead irrigation equipment;
a plurality of tower structures for supporting the interconnected spans;
a ground-based platform for coupling with at least one span of overhead irrigation equipment, the ground-based platform having a drive for moving the ground-based platform, wherein the ground-based platform does not substantially provide structural support to the span of overhead irrigation equipment, and further wherein the center of mass of the ground-based platform extends outside the structural width of the overhead irrigation equipment; and
a linkage for coupling the at least one span of overhead irrigation equipment with the ground-based platform, the linkage communicatively coupled with the drive of the ground-based platform for communicating information regarding a change in at least one of a position, a direction, or a speed of the at least one span of overhead irrigation equipment with respect to the ground-based platform, the drive of the ground-based platform configured to use the information received from the linkage to coordinate movement of the ground-based platform with movement of the at least one span of overhead irrigation equipment.

2. The irrigation system as recited in claim 1, wherein the drive comprises a variable speed electric motor.

3. The irrigation system as recited in claim 1, further comprising a center pivot structure, the plurality of interconnecting spans of overhead irrigation equipment coupled to the center pivot structure.

4. The irrigation system as recited in claim 1, wherein the ground-based platform comprises a sensor for coupling with the linkage for sensing a mechanical force exerted on the linkage by the at least one span of overhead irrigation equipment.

5. The irrigation system as recited in claim 4, wherein the drive of the ground-based platform is communicatively coupled to the sensor, the drive configured to modify the speed of the ground-based platform based upon the determined change in the at least one of the position, the direction, or the speed of the at least one span of overhead irrigation equipment.

6. The irrigation system as recited in claim 1, wherein the ground-based platform includes cooling equipment for cooling crops.

7. The irrigation system as recited in claim 1, wherein the linkage for coupling the at least one span of overhead irrigation equipment with the ground-based platform comprises a power connection for powering the ground-based platform from the at least one span of overhead irrigation equipment.

8. The irrigation system as recited in claim 1, wherein the ground-based platform includes pruning equipment.

9. A device comprising:
a ground-based platform for coupling with a span of overhead irrigation equipment, wherein the ground-based platform does not substantially provide structural support to the span of overhead irrigation equipment, and further wherein the center of mass of the ground-based platform extends outside the structural width of the overhead irrigation equipment;
a drive for moving the ground-based platform; and
a linkage connected to the ground-based platform for coupling the span of overhead irrigation equipment with the ground-based platform, the linkage communicatively coupled with the drive of the ground-based platform for communicating information regarding a change in at least one of a position, a direction, or a speed of the span of overhead irrigation equipment with respect to the ground-based platform, the drive of the ground-based platform configured to use the information received from the linkage to coordinate movement of the ground-based platform with movement of the span of overhead irrigation equipment.

10. The device as recited in claim 9, wherein the ground-based platform includes cooling equipment for cooling crops.

11. The device as recited in claim 9, wherein the linkage for coupling the span of overhead irrigation equipment with the ground-based platform comprises a power connection for powering the ground-based platform from the span of overhead irrigation equipment.

12. The device as recited in claim 9 wherein the drive comprises a variable speed electric motor.

13. The device as recited in claim 9, further comprising pruning equipment.

14. An irrigation system comprising:
a plurality of interconnected spans;
a plurality of tower structures for supporting the interconnected spans;
a ground-based platform coupled to one of the interconnected spans, the ground-based platform having a drive for moving the ground-based platform, wherein the ground-based platform does not substantially provide structural support to the span of overhead irrigation equipment, and further wherein the center of mass of the ground-based platform extends outside the structural width of the overhead irrigation equipment; and a linkage for coupling one of the interconnected spans with the ground-based platform, the linkage communicatively coupled with the drive of the ground-based platform for communicating information regarding a change in at least one of a position, a direction, or a speed of the corresponding interconnected span with respect to the ground-based platform, the drive of the ground-based platform configured to use the information received from the linkage to coordinate movement of the ground-based platform with movement of one of the plurality of interconnected spans.

15. The irrigation system as recited in claim 14, wherein the drive comprises a variable speed electric motor.

16. The irrigation system as recited in claim 14, further comprising a center pivot structure, the plurality of interconnected spans are coupled to the center pivot structure.

17. The irrigation system as recited in claim 14, wherein the ground-based platform includes cooling equipment for cooling crops.

18. The irrigation system as recited in claim 14, wherein the linkage for coupling one of the plurality of interconnected spans with the ground-based platform comprises a power connection for powering the ground-based platform from one of the plurality of interconnected spans.

19. The irrigation system as recited in claim 14, wherein the ground-based platform includes pruning equipment.

20. The irrigation system as recited in claim 14, wherein the ground-based platform comprises a sensor for coupling with the linkage for sensing a mechanical force exerted on the linkage by one of the plurality of interconnected spans.

\* \* \* \* \*